June 3, 1930. R. M. PALMER 1,760,992
PROCESS OF PRODUCING TITANIUM OXIDE
Filed May 25, 1926
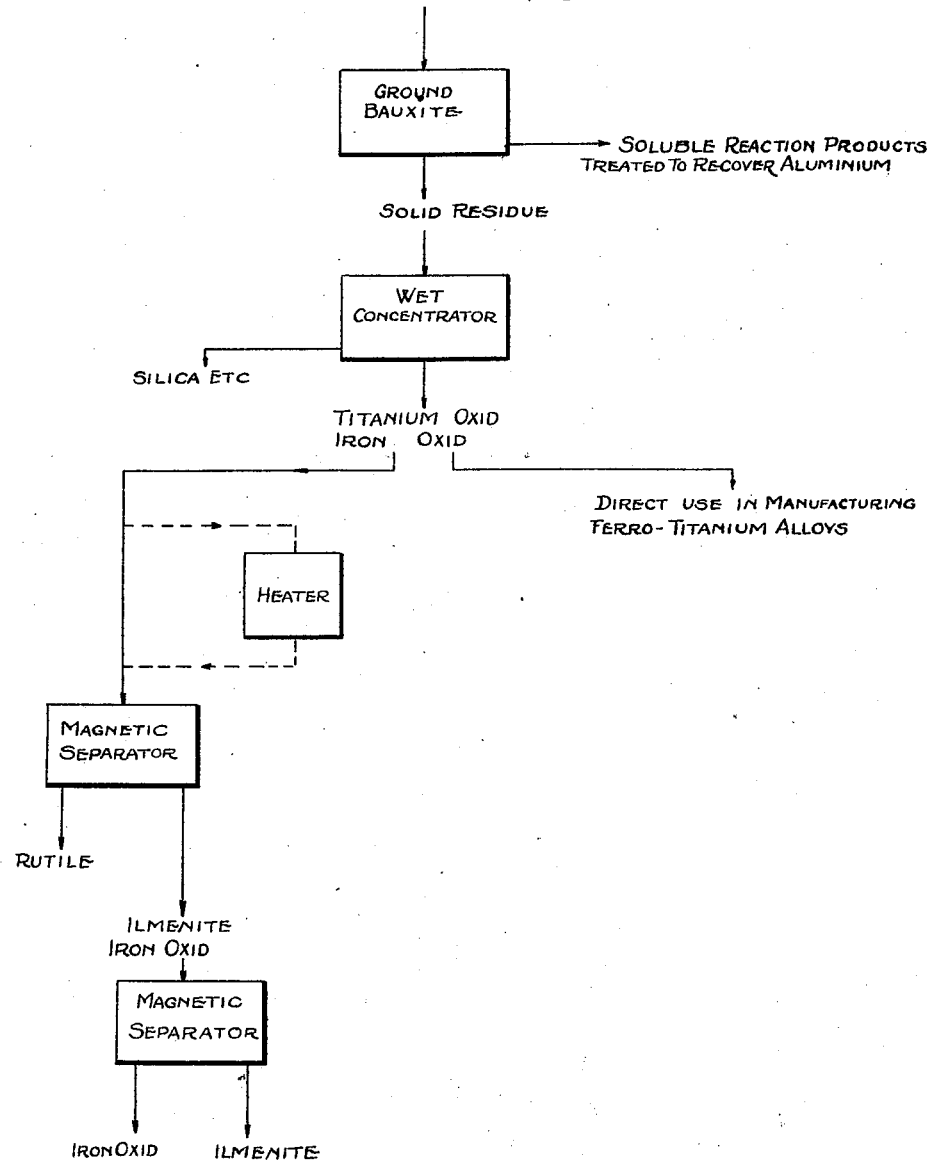
Inventor
RALPH M. PALMER
By
C. L. Parker, Jr.
Attorney Patented June 3, 1930

1,760,992

UNITED STATES PATENT OFFICE

RALPH M. PALMER, OF NEW YORK, N. Y.

PROCESS OF PRODUCING TITANIUM OXIDE

Application filed May 25, 1926. Serial No. 111,629.

This invention relates to the production of titanium containing oxides and has particular reference to the recovery of titanium containing oxides in connection with or as an ancillary step in the manufacture of aluminum or aluminum salts from bauxite by what I term the digestion process.

The accompanying drawing is a flow sheet illustrating the process claimed.

In the process of manufacture of aluminum and aluminum salts from bauxite by the digestion process finely ground bauxite is first digested with an alkali or an acid until the soluble aluminum content of the bauxite is dissolved and the resulting solution separated from the bauxite residue or mud.

In the manufacture of metallic aluminum the finely ground bauxite is ordinarily digested in 45° Baumé sodium hydroxid at 3–4 atmospheres pressure for several hours and the resulting solution of sodium aluminate and other dissolved constituents of the bauxite, after removal from the solid residue, treated for the production of metallic aluminum.

In the production of aluminum sulfate finely ground bauxite is digested in sulfuric acid of from 70 to 75 per cent strength for from eight to twenty hours at boiling temperature and the resulting aluminum sulfate and other dissolved constituents of the bauxite removed from the solid residue.

I have discovered that the bauxite residue or mud produced in the digestion process of manufacturing aluminum and aluminum salts contains titanium containing oxides which are recoverable from such residue as by wet concentration on a riffle board to separate the titanium containing oxides and iron oxides with ordinarily small amounts of silica, alumina and other impurities, the removal of the ferro-titanium oxide and the iron oxide by magnetic separation and the final separation of the ferro-titanium oxide from the iron oxide by further magnetic separation.

I also have discovered that the titanium containing oxides are more readily and cheaply recovered from the bauxite residue if such residue is promptly treated to recover the titanium containing oxides than if allowed to stand for a considerable period thereby losing a substantial amount of the water initially present therein. If the residue is not promptly treated and is allowed to become dry it is advisable to add water thereto to restore it to substantially its initial condition with respect to its water content and to knead or otherwise treat the material to effectually separate the attached or agglomerated particles of the residue. No grinding of the residue is necessary either when it is promptly treated or where it is allowed to stand even for long periods, the fineness of the particles of the residue being such as to permit of the ready separation or recovery of titanium containing oxides therefrom.

In the preferred practice of my process I proceed in accordance with my discoveries as hereinbefore set forth, that is to say, after the bauxite has been treated by a conventional process, such as the digestion process of manufacturing aluminum and aluminum salts, the residue in the form of a sludge is subjected to a step of wet concentration preferably by feeding the sludge into a vanner in the ratio of one part of the sludge (dry basis) to approximately five parts of water. The concentrate produced by this operation is dried in a suitable dryer preferably a hot air dryer and thereafter the dried concentrate is passed through a magnetic separator of any suitable conventional construction. The following conditions may advantageously be employed during this step: 220 volts; 1 to 2½ amperes; belt travel from 50 to 75 feet per minute; and $\frac{5}{16}$ of an inch gap. It is to be understood however that these conditions may be widely varied without seriously affecting the results. The final concentrate produced will vary in titanium content according to the ratio of the $TiO_2$ to the $FeTiO_3$ but it may contain approximately 70% of titanium oxides.

In my work I have found that the titanium containing oxides first separated from the bauxite residues along with oxide of iron, in the wet concentration, are ordinarily in the form of a mixture of $FeTiO_3$ (ilmenite)

which may initially possess magnetic permeability and TiO$_2$ (rutile) which possesses little or no magnetic permeability. Where the ilmenite is initially nonmagnetic I ordinarily subject the recovered material to heat in order that the nonmagnetic ilmenite may be rendered magnetic to permit of its magnetic separation. However, where the ilmenite is entirely nonmagnetic it may be separated along with the rutile in the initial separation by wet concentration. In such case, the mixture may be then heated to render the ilmenite magnetic and the two materials separated by magnetic separation.

The ferro-titanium oxide (ilmenite) and the iron oxide are separated from the titanium oxide (rutile) by magnetic separation and the iron oxide is then separated from the iron and titanium oxide by further magnetic separation. This last mentioned separation may be readily accomplished owing to the superior magnetic permeability of the iron oxide.

The FeTiO$_3$ and TiO$_2$ as separated from the bauxite residues and from the iron oxides present in such residues are generally of a black color. If the titanium oxides are to be employed as a white pigment it is necessary to remove from such oxides all iron constituents. This may be accomplished in the usual or known ways as for example, by the methods set forth in Letters Patent No. 1,501,587 or No. 1,504,669 or by other known processes.

If the titanium containing oxides are to be employed in the manufacture of ferro-titanium alloys it is unnecessary to remove the iron constituents of the titanium containing oxides recovered from the bauxite residues.

In the practice of my process as hereinbefore set forth I have found that the tailings from the concentrating operation, that is to say the tailings from the riffle board, may be advantageously employed in the production of finely divided silica suitable for use in increasing the fluidity of concrete and for other purposes. I therefore prefer in the practice of my process to conduct the tailings from the riffle board to a settling tank where the finely divided silica separates by sedimentation and is filtered and dried. Such finely divided silica contains small quantities of iron oxides and other impurities which need not be separated where the silica is to be employed as an admixture to concrete but may be separated by known methods if a pure finely divided silica is required.

As hereinbefore indicated, I may employ in the wet separation process a riffle board, but also may advantageously employ a Wilfley table, a Dorr bowl classifier, a Brown classifier, a vanner or like wet separation apparatus.

While I have described in detail the preferred practice of my process it is to be understood that such process is not limited to the details set forth except as defined in the appended claims.

I claim:

1. In the herein described process, the steps of subjecting the residue from a digestion process for recovering the aluminum content of bauxite to wet concentration to separate iron oxide, ferro-titanium oxide and titanium oxide therefrom, magnetically separating titanium oxide from the ferro-titanium oxide and iron oxide, and magnetically separating the ferro-titanium oxide from the iron oxide.

2. The herein described process comprising digesting bauxite to recover the aluminum content thereof, subjecting the resulting bauxite residue to wet concentration to separate iron oxide, ferro-titanium oxide and titanium oxide therefrom, and magnetically separating the titanium-containing oxide from the iron oxide.

3. In the herein described process, the steps of subjecting the residue from a digestion process of recovering the aluminum content of bauxite to wet concentration to remove iron oxide, ferro-titanium oxide and titanium oxide therefrom, and magnetically separating the titanium-containing oxides from such separated materials.

In testimony whereof I affix my signature.

RALPH M. PALMER.